(12) United States Patent
Farrell et al.

(10) Patent No.: US 8,298,426 B1
(45) Date of Patent: *Oct. 30, 2012

(54) METHOD OF TREATING A LIQUID BY COUNTER CURRENT SUPERSATURATION OXYGENATION

(76) Inventors: Dean E. Farrell, Palm Springs, CA (US); Ronald W. Ketler, Canby, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/220,886

(22) Filed: Aug. 30, 2011

(51) Int. Cl.
*C02F 1/74* (2006.01)

(52) U.S. Cl. ............ 210/615; 210/620; 210/747.9; 210/758; 210/220; 261/77

(58) Field of Classification Search ............ 210/605, 210/615, 630, 747.1, 747.9, 758, 760, 761, 210/220; 261/77, 123, DIG. 42
See application file for complete search history.

(56) References Cited

U.S. PATENT DOCUMENTS

| | | | |
|---|---|---|---|
| 3,643,403 A | | 2/1972 | Speece |
| 3,680,704 A | * | 8/1972 | Schaefer ............ 210/218 |
| 4,217,211 A | | 8/1980 | Crane |
| 4,278,546 A | * | 7/1981 | Roesler ............ 210/220 |
| 5,651,891 A | * | 7/1997 | Molof et al. ............ 210/605 |
| 5,843,307 A | * | 12/1998 | Faivre et al. ............ 210/760 |
| 6,017,020 A | * | 1/2000 | Baughman et al. ............ 261/123 |
| 2002/0105100 A1 | * | 8/2002 | Speece ............ 261/123 |
| 2005/0269259 A1 | * | 12/2005 | Dunlop et al. ............ 210/209 |

OTHER PUBLICATIONS

Oxyen Supplementation, A New Technology in Fish Culture, U.S. Department of Interior Fish and Wildlife Service Region 6, Information Bulletin, pp. 407-408, 1987.

* cited by examiner

*Primary Examiner* — Lucas Stelling
(74) *Attorney, Agent, or Firm* — Donald J. Ersler

(57) ABSTRACT

A counter current supersaturation oxygenation method includes an apparatus, which includes a down flow tube, an upflow tube and a gas diffuser. The gas diffuser preferably includes a porous tube and a support frame. The porous tube is preferably wrapped in a spiral from a bottom of the support frame to a top of the support frame. A non-porous gas supply hose is connected to the porous tube. The gas diffuser is suspended inside the down flow tube at substantially a bottom thereof. One end of the upflow tube is connected to substantially a bottom of the down flow tube. A second embodiment of the apparatus preferably includes a down flow tube, the gas diffuser and a buoyant platform. A stream of liquid becomes oxygenated by passing down the down flow tube. The oxygenated liquid may flow up the upflow tube or down to any appropriate destination.

20 Claims, 5 Drawing Sheets

METHOD OF TREATING A LIQUID BY COUNTER CURRENT SUPERSATURATION OXYGENATION

BACKGROUND OF THE INVENTION

1. Field of the Invention

The present invention relates generally to supersaturating a liquid with a gas containing oxygen and more specifically to a method of treating a liquid by counter current supersaturation oxygenation, which enables oxygen supersaturation of the liquid.

2. Discussion of the Prior Art

U.S. Pat. No. 3,643,403 to Speece discloses a downflow bubble contact aeration apparatus and method. The Speece patent includes the aeration of oxygen deficient water by dispersing bubbles of air or oxygen gas in a forced downflow of water through a downwardly diverging funnel trapping the bubbles therein for a prolonged contact with water. However, Speece must use water under pressure to properly oxygenate the water.

U.S. Pat. No. 4,217,211 to Crane discloses a pressurized treatment of sewage. The Crane patent includes passing a liquor of the sewage into a subterranean shaft through an inner shaft, which extends only partway down into a deep subterranean shaft. A mixing shaft is located at a lower proximity of the inner shaft. The descending sewage liquor passes downwardly through the mixing nozzles to the bottom of the subterranean shaft.

U-tubes are known in the art and include a vertical shaft 30-150 feet deep, which is either partitioned into two sections or consisting of two concentric pipes. Oxygen is sparged at the top of the down-leg of the U-tube and is transferred into a gas-liquid mixture. The gas-liquid mixture exits an up-leg of the U-tube. However, U-tubes oxygenate a water stream at a top of the intake, which results in less efficient oxygenation of the water stream.

It is more efficient to treat waste water using oxygen instead of using normal air. For example, oxygen provides superior activation of the bacteria and protozoans used in activated sludge.

Accordingly, there is a clearly felt need in the art for a method of treating a liquid by counter current supersaturation oxygenation, which enables a more efficient oxygen supersaturation of the liquid than that of the prior art and which does not require the use of pressurized water.

SUMMARY OF THE INVENTION

The present invention provides a method of treating a liquid by counter current supersaturation oxygenation (counter current supersaturation oxygenation method), which enables oxygen supersaturation of a liquid. An apparatus for implementing the counter current supersaturation oxygenation method preferably includes a down flow tube, an upflow tube and a gas diffuser. The down flow tube is preferably a subterranean shaft, if the down flow tube is formed in the ground. The gas diffuser preferably includes a porous tube and a support frame. The support frame includes a substantial funnel shape with a large perimeter disposed on a bottom thereof. The porous tube is preferably wrapped in a spiral from a bottom of the support frame to a top of the support frame.

A pneumatic T-connector includes a first end leg, a second end leg and a T-leg. A non-porous gas supply hose is connected to the first end leg. One end of the porous tube is connected to the second end leg and the other end of the porous tube is connected to the T-leg. Preferably, a supply of at least 93 percent pure oxygen is supplied to the porous tube through the gas supply hose. The gas diffuser is suspended inside the down flow tube, above an entrance to the upflow tube. One end of the upflow tube is connected to substantially a bottom of the down flow tube, below the gas diffuser. The other end of the upflow tube extends above the gas diffuser. The upflow tube is preferably located outside the down flow tube to minimize turbulence, but could also be located inside the down flow tube.

A second embodiment of an apparatus for implementing counter current supersaturation oxygenation method preferably includes a down flow tube, the gas diffuser and a buoyant platform. The buoyant platform is set in a body of liquid, such as a retaining pond, a pond or a lake. A top of the down flow tube is retained by the buoyant platform. The gas diffuser is suspended inside the down flow tube at substantially a bottom thereof. If the upflow tube is needed, because of a thermocline in the body of liquid, a top of the upflow tube is retained in the buoyant platform adjacent the down flow tube. A pump is used to transfer liquid from the upflow tube to substantially the top of the down flow tube. An entrance to the upflow tube is located above a bottom of the down flow tube or below a thermocline in the body of liquid. The liquid in the body of liquid is oxygenated by the gas diffuser.

A stream of liquid is flowed down the down flow tube. The stream of liquid becomes oxygenated by passing down the down flow tube. Oxygen passes up from the gas diffuser and into the stream of liquid at a rise rate slightly above the down flow water velocity. The oxygenated liquid flows up the upflow tube. The depth and perimeter of the down flow tube is determined by the oxygenation needs of the liquid.

The counter current supersaturation oxygenation method includes feeding a liquid into a down flow tube. The down flow tube includes a gas diffuser suspended inside the down flow tube, above an entrance to an upflow tube (if an upflow tube is used). Oxygenated gas is emitted through the gas diffuser to oxygenate the liquid. Activated sludge and/or fixed film may be added to a waste water, before feeding the waste water into the down flow tube. Oxygenated waste water 116 exits the down flow tube through the upflow tube.

Accordingly, it is an object of the present invention to provide a counter current supersaturation oxygenation method, which enables more efficient oxygen supersaturation of a liquid than that of the prior art.

These and additional objects, advantages, features and benefits of the present invention will become apparent from the following specification.

DETAILED DESCRIPTION OF THE PREFERRED EMBODIMENTS

Figure 1:
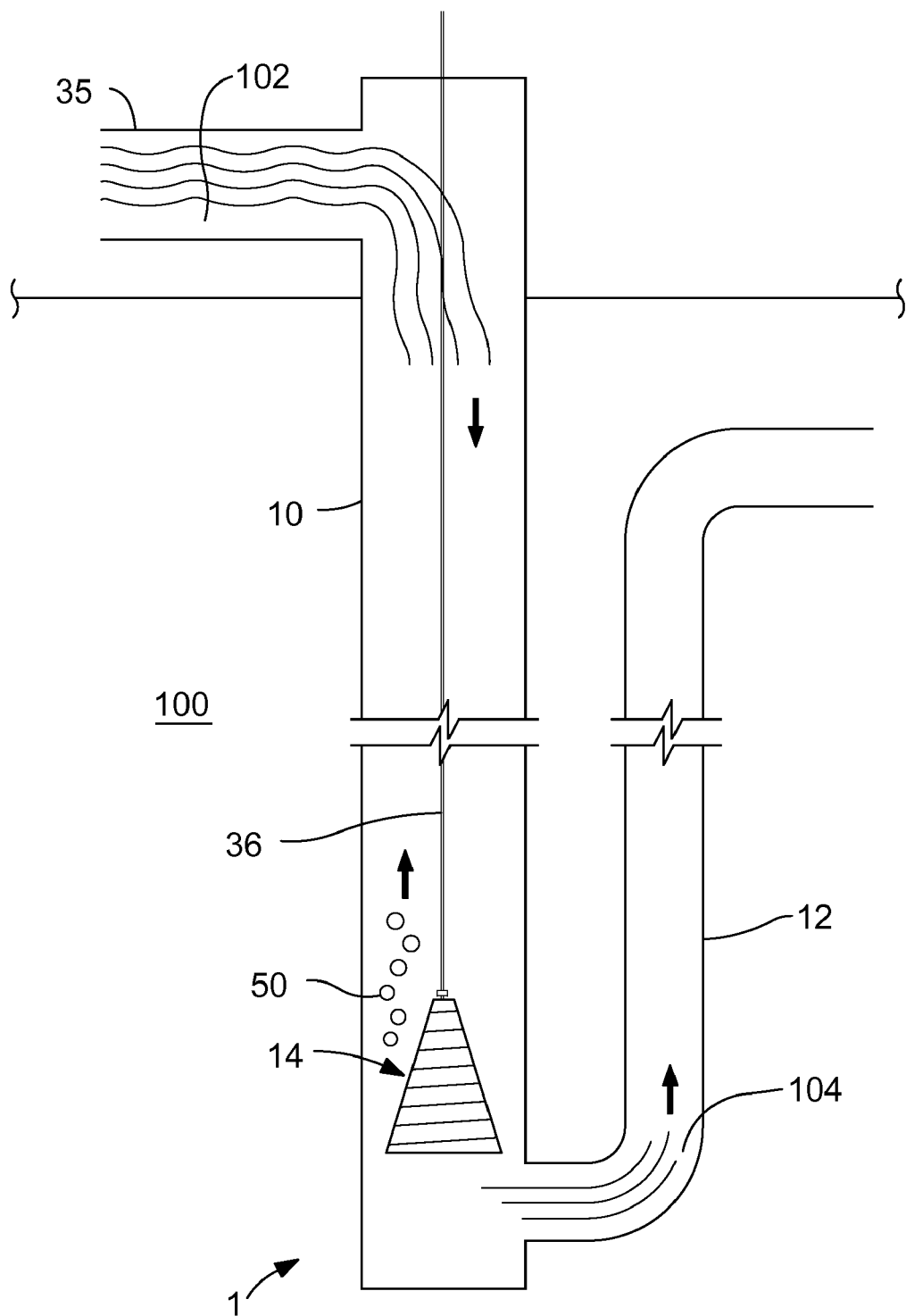
FIG. 1 is a cross sectional view of a counter current supersaturation oxygenation method with an upflow tube located outside a down flow tube in accordance with the present invention.

With reference now to the drawings, and particularly to FIG. 1, there is shown a cross sectional view of an oxygenation apparatus 1 for implementing counter current supersaturation oxygenation. The oxygenation apparatus 1 preferably includes a down flow tube 10, an upflow tube 12 and a gas diffuser 14. The down flow tube 10 is preferably a subterranean shaft, if the down flow tube 10 is formed in the ground 100. The down flow tube 10 has a substantially vertical axis.

Figure 4:
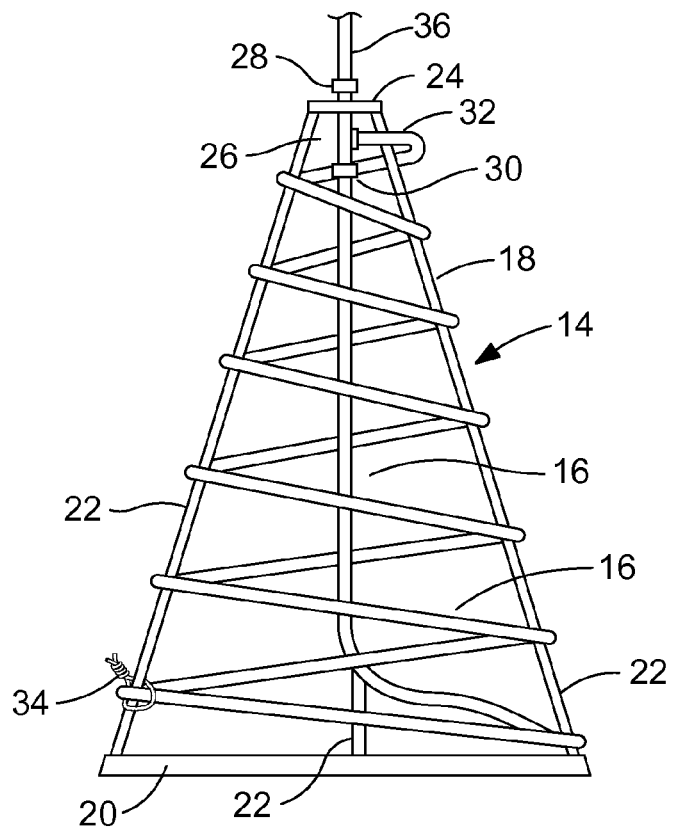
FIG. 4 is a side view of a gas diffuser of a counter current supersaturation oxygenation method in accordance with the present invention.
Figure 5:
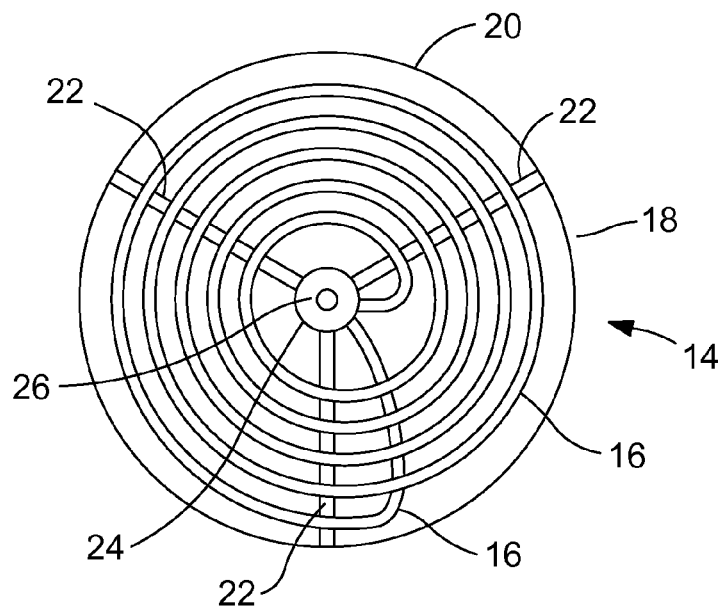
FIG. 5 is a top view of a gas diffuser of a counter current supersaturation oxygenation method in accordance with the present invention.

With reference FIGS. 4-5, the gas diffuser 14 preferably includes a porous tube 16 and a support frame 18, but other designs of gas diffusers could also be used. Pressurized oxygen is emitted throughout the surface area of the porous tube 16. Preferably, the oxygen supplied through the porous tube 16 is at least 93 percent pure. A source of oxygen may be an oxygen generator, a supply liquid oxygen or any other appropriate oxygen source. The support frame 18 preferably includes a lower ring 20, a plurality of support rods 22 and a top plate 24. One end of the plurality of supports rods 22 are attached to the lower ring 20 with welding or the like and the other end of the plurality support rods 22 are attached to the top plate 24 with welding or the like. The lower ring 20 has a larger perimeter than the top plate 24, which causes the support frame 18 to have a substantial funnel shape.

A pneumatic T-connector 26 includes a first end leg 28, a second end leg 30 and a T-leg 32. The porous tube 16 is preferably wrapped around the plurality of support rods 22 in a spiral from the lower ring 20 to the top plate 24. The porous tube 16 is preferably secured to the plurality of support rods 22 with a plurality of wires 34 twisted around the porous tube 16 and the plurality of support rods 22 at a plurality crossing points, but other securement methods may also be used. A non-porous gas supply hose 36 is secured to the first end leg 28 of the pneumatic T-connector 26 with a first hose clamp or the like. One end of the porous tube 16 is secured to the second end leg 30 with a second hose clamp or the like and the other end of the porous tube 16 is secured to the T-leg 32 with a third hose clamp or the like. The gas diffuser 14 is suspended by the gas supply hose 36 inside the down flow tube 10 and at substantially a bottom thereof. An entrance to the upflow tube 12 is located below the gas diffuser 14. The bottom of the down flow tube 10 is located lower than the entrance to the upflow tube 12 to handle the air lift effect.

One end of the upflow tube 12 is connected to substantially a bottom of the down flow tube 10. An entrance to the upflow tube 12 is located below the gas diffuser 14. The other end of the upflow tube 12 extends at least above the gas diffuser 14. A liquid supply tube 35 supplies liquid 102 to a top of the down flow tube 10. The liquid supply tube 35 receives liquid stored at a higher level than an entrance to the down flow tube 10 or any suitable pump is used to lift the liquid to a height of at least 3 feet. It is preferable to locate the upflow tube 12 outside the down flow tube 10 to minimize turbulence in the down flow tube 10.

Figure 2:
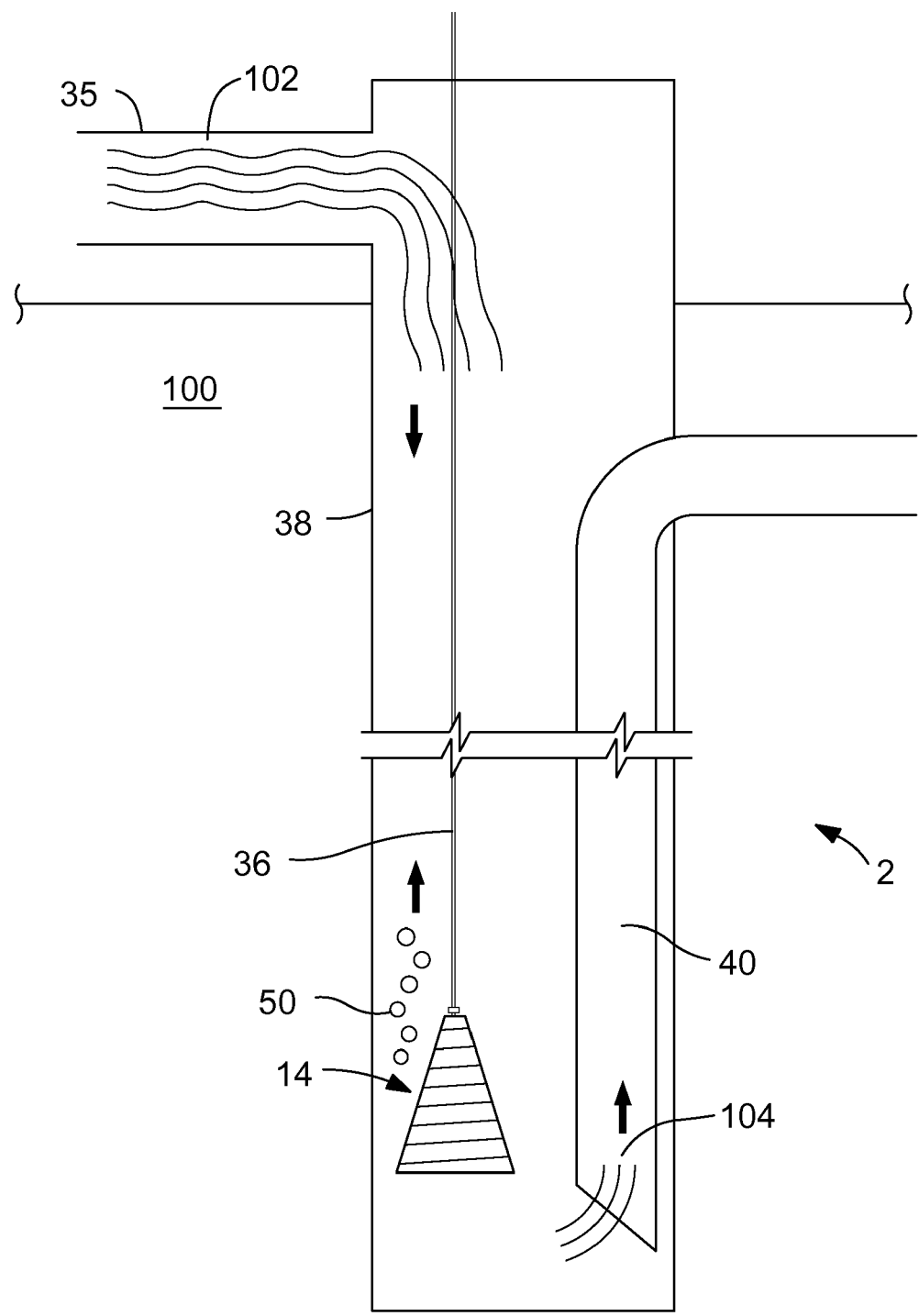
FIG. 2 is a cross sectional view of a counter current supersaturation oxygenation method with an upflow tube located on an inside of a down flow tube in accordance with the present invention.

With reference to FIG. 2, an upflow tube 40 may also be located inside a down flow tube 38. An entrance to the upflow tube 40 is located below the gas diffuser 14. The other end of the upflow tube 40 extends through a wall of the down flow tube 38, above the gas diffuser 14.

Figure 3:
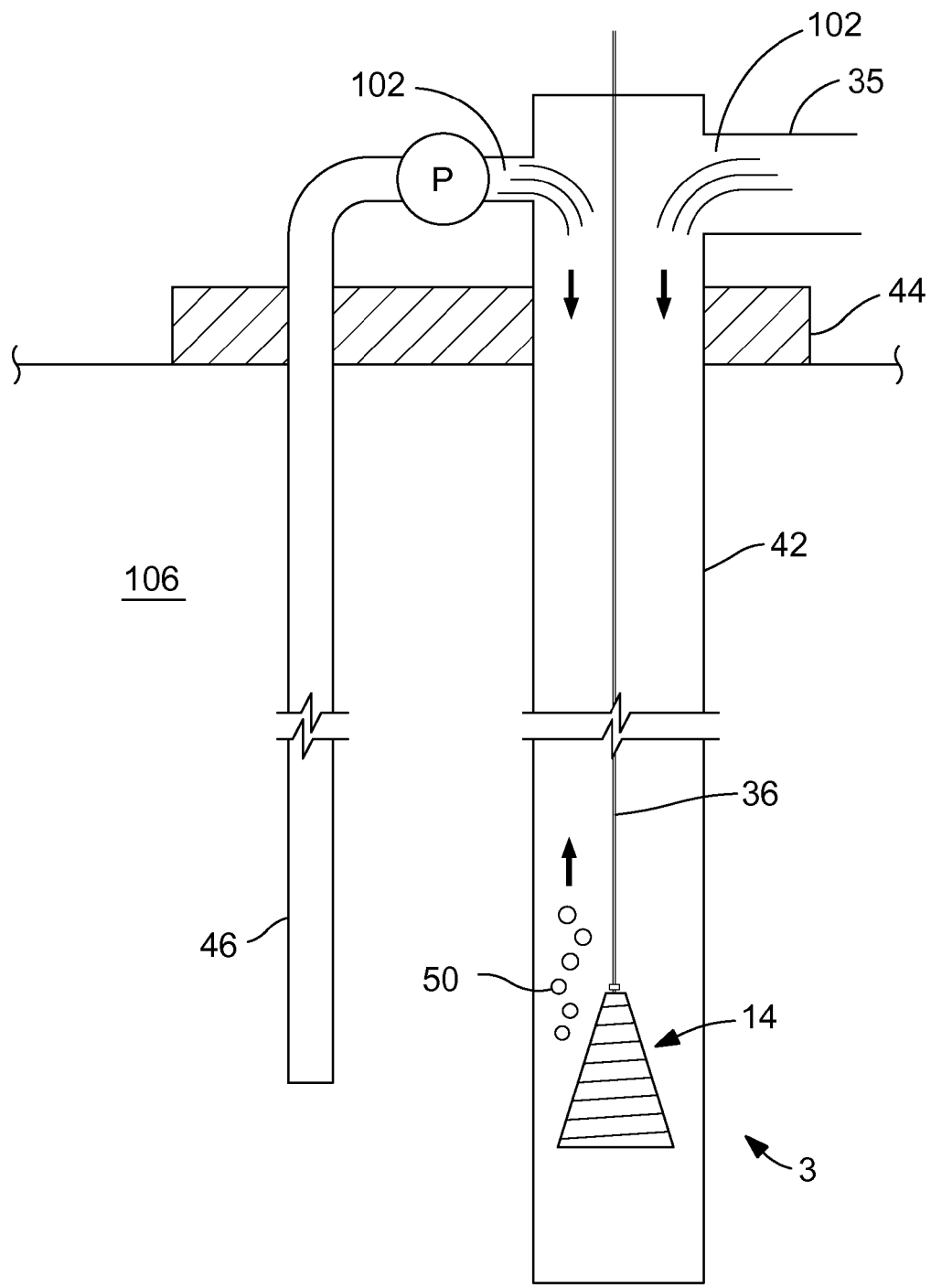
FIG. 3 is a cross sectional view of a second embodiment of a counter current supersaturation oxygenation method in accordance with the present invention.

With reference to FIG. 3, a second embodiment of an oxygenation apparatus 2 preferably includes a down flow tube 42, the gas diffuser 14 and a buoyant platform 44. The buoyant platform 44 is set in a body of liquid 106, such as a retention pond, a pond, reservoir or a lake. A top of the down flow tube 42 is retained by the buoyant platform 44. The gas diffuser 14 is suspended inside the down flow tube 42 at substantially a bottom thereof. The stream of liquid 102 is flowed down the down flow tube 42 through either the liquid supply tube 35 or the upflow tube 46. If the upflow tube 46 is used to supply the stream of liquid 102, a pump 48 is used to draw liquid from the body of liquid 106 and flow the stream of liquid 102 into the down flow tube 42. It is preferable to use the upflow tube 46 and the pump 48 instead of the liquid supply tube 35, when there is an extreme thermocline between the surface liquid and the liquid at a bottom of the body of water 106. A bottom of the upflow tube 46 is located away from a bottom of the down flow tube 42 to prevent oxygenated water from being pulled into the upflow tube 46.

The stream of liquid 102 is flowed down the down flow tube 10, 38, 42. A depth of the down flow tube 10, 38, 42 is at least 20 feet. A liquid, such as water or waste water may be saturated by volume with oxygen in a 10:1 ratio, where 1 cubic foot may be dissolved into 10 cubic feet of water. An increased depth of the down flow tube 10, 38, 42 will provide more efficient oxygenation of the liquid 102, because of increased amount of time it takes for the oxygen bubbles 50 to exit a top of the down flow tube 10, 38, 42. The stream of liquid becomes oxygenated by passing through the down flow tube 10, 38, 42. The oxygen bubbles 50 travel-up through the liquid stream 102 from the gas diffuser 14.

The preferred flow rate of liquid down the down flow tube 10, 38, 42 cannot exceed one foot/second. The preferred flow rate of liquid traveling up the upflow tube 12, 40. 46 cannot exceed five feet/second. If a large quantity of oxygen bubbles 50 come out of an open top of the upflow tube 12, 40, the velocity of the liquid 102 going down the down flow tube 10, 38 is too fast. It is normal to have some oxygen bubbles 50 come out of the open top of the down flow tube 10, 38, 42. The oxygenated liquid 104 flows up the upflow tube 12, 40, 46 to any appropriate destination. The depth and perimeter of the down flow tube is determined by the oxygenation needs of the liquid and the amount of liquid to be oxygenated.

Figure 6:
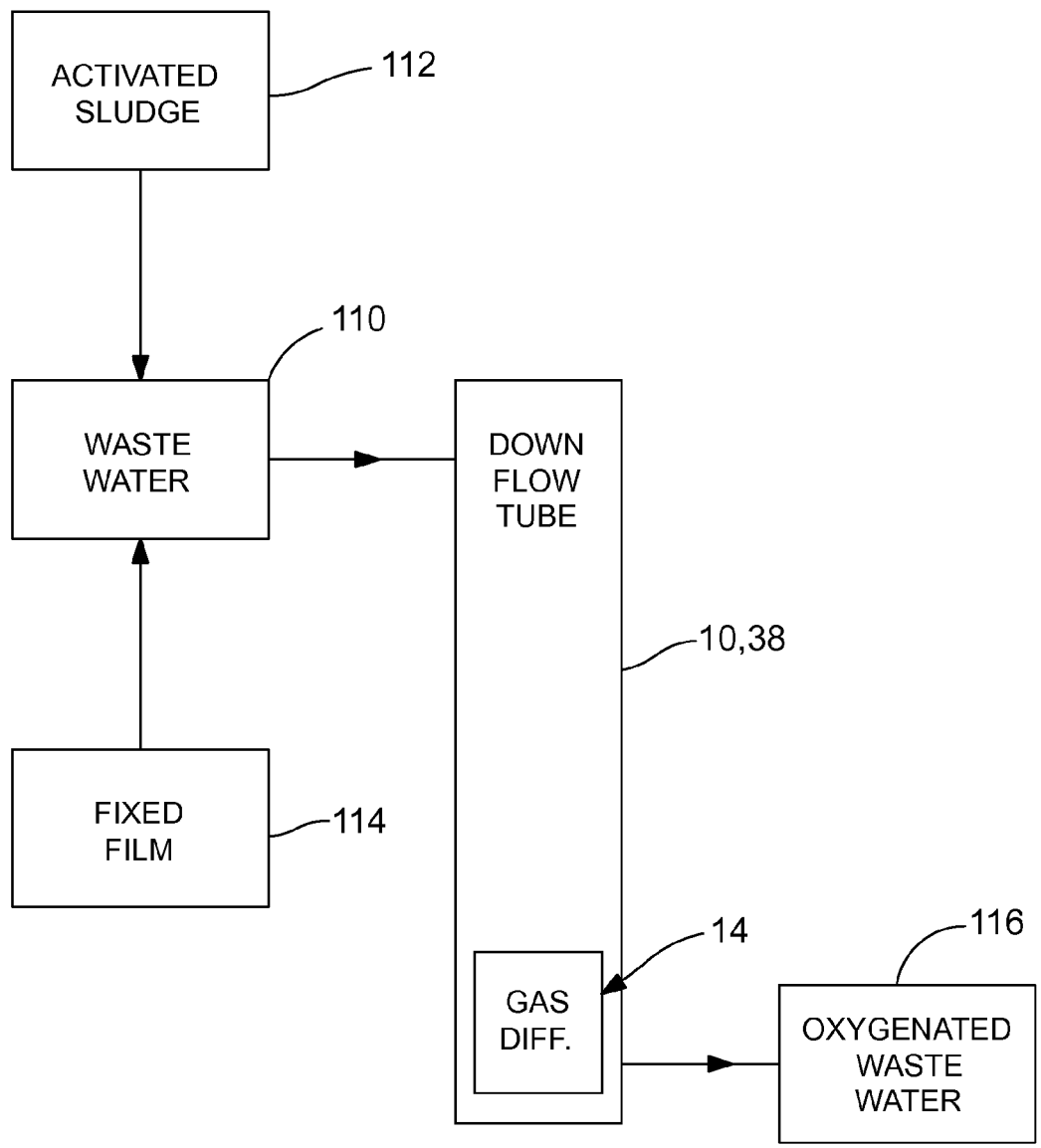
FIG. 6 is a schematic diagram of activated sludge and/or fixed film being added to waste water, before treatment with a counter current supersaturation oxygenation method in accordance with the present invention.

With reference to FIG. 6, waste water 110 is fed into the down flow tube 10, 38. The oxygenated gas 50 emitted through the gas diffuser 14 is preferably at least 93% pure. However, the gas may contain lesser concentrations of oxygen by weight, such as 30%, 50%, 70% or 85%. The waste water 110 comes in contact with the gas diffuser 10, which emits the oxygenated gas 50. Activated sludge 112 and/or fixed film 114 may be added to the waste water 110, before feeding the waste water 110 into the down flow tube 10. Oxygenated waste water 116 exits the down flow tube 10 through the upflow tube 12, 40.

The liquid may be any liquid, which is oxygenated for some purpose, such as water and waste water sludge. The waste water sludge is oxygenated to increase the amount of bacteria placed in the waste water sludge for consuming undesirable organic material in the waste water sludge. Organic consuming bacteria needs oxygen to live and multiply.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

We claim:

1. A method of treating a liquid by counter current supersaturation oxygenation, comprising the steps of:
   providing a down flow tube having a top and a bottom;
   providing an upflow tube extending through a sidewall of said down flow tube, an entrance to said upflow tube is disposed at substantially said bottom of said down flow tube, a cross section of said down flow tube is greater than a cross section of said upflow tube;
   providing a supply of gas having an oxygen content of at least 30% by weight; and
   providing a gas diffuser having a plurality of openings for emitting said supply of gas, said gas diffuser is retained inside said down flow tube; and
   flowing a stream of liquid down said down flow tube at substantially said top thereof, said stream of liquid flowing up said upflow tube, said stream of liquid flowing down said down flow tube at a rate such that said supply of gas flows up through an entire length of said stream of liquid to said top of said down flow tube.

2. The method of treating a liquid by counter current supersaturation oxygenation of claim 1, further comprising the step of:
   providing waste water for said liquid.

3. The method of treating a liquid by counter current supersaturation oxygenation of claim 2, further comprising the step of:
   treating said waste water with activated sludge before flowing said liquid down said down flow tube.

4. The method of treating a liquid by counter current supersaturation oxygenation of claim 2, further comprising the step of:
   treating said waste water with fixed film before flowing said liquid down said down flow tube.

5. The method of treating a liquid by counter current supersaturation oxygenation of claim 1, further comprising the step of:
   providing a subterranean shaft formed in the ground for said down flow tube.

6. The method of treating a liquid by counter current supersaturation oxygenation of claim 1, further comprising the step of:
   extending an opposing end of said upflow tube above said gas diffuser.

7. The method of treating a liquid by counter current supersaturation oxygenation of claim 1, further comprising the step of:
   providing said down flow tube with a depth of at least 20 feet.

8. A method of treating a liquid by counter current supersaturation oxygenation, comprising the steps of:
   providing a down flow tube having a top and a bottom;
   providing an upflow tube extending through a sidewall of said down flow tube, an entrance to said upflow tube is disposed at substantially said bottom of said down flow tube, a cross section of said down flow tube is greater than a cross section of said upflow tube;
   providing a supply of gas having an oxygen content of at least 30% by weight; and
   providing a gas diffuser having a plurality of openings for emitting said supply of gas, said gas diffuser is retained inside substantially said bottom of said down flow tube; and
   flowing a stream of liquid down said down flow tube at substantially said top thereof, said stream of liquid becoming oxygenized when flowing down said down flow tube, said stream of liquid flowing up said upflow tube, said stream of liquid flowing down said down flow tube at a rate such that said supply of gas flows up through an entire length of said stream of liquid to said top of said down flow tube.

9. The method of treating a liquid by counter current supersaturation oxygenation of claim 8, further comprising the step of:
   providing waste water for said liquid.

10. The method of treating a liquid by counter current supersaturation oxygenation of claim 9, further comprising the step of:
    treating said waste water with activated sludge before flowing said liquid down said down flow tube.

11. The method of treating a liquid by counter current supersaturation oxygenation of claim 9, further comprising the step of:
    treating said waste water with fixed film before flowing said liquid down said down flow tube.

12. The method of treating a liquid by counter current supersaturation oxygenation of claim 8, further comprising the step of:
    providing a subterranean shaft formed in the ground for said down flow tube.

13. The method of treating a liquid by counter current supersaturation oxygenation of claim 8, further comprising the step of:
    extending an opposing end of said upflow tube above said gas diffuser.

14. The method of treating a liquid by counter current supersaturation oxygenation of claim 8, further comprising the step of:
    providing said down flow tube with a depth of at least 20 feet.

15. A method of treating a liquid by counter current supersaturation oxygenation, comprising the steps of:
    providing a down flow tube having a top and a bottom;
    providing an upflow tube extending through a sidewall of said down flow tube, an entrance to said upflow tube is disposed at substantially said bottom of said down flow tube, a cross section of said down flow tube is greater than a cross section of said upflow tube;
    providing a supply of gas having an oxygen content of at least 30% by weight; and
    providing a gas diffuser having a plurality of openings for emitting said supply of gas, said gas diffuser is retained in substantially said bottom of said down flow tube; and
    flowing a stream of liquid down said down flow tube at substantially said top thereof, said stream of liquid becoming oxygenized when flowing down said down flow tube, said stream of liquid flowing up said upflow tube at a velocity greater than down said down flow tube, an opposing end of said upflow tube not communicating with said top of said down flow tube, said stream of liquid flowing down said down flow tube at a rate such that said supply of gas flows up through an entire length of said stream of liquid to said top of said down flow tube.

16. The method of treating a liquid by counter current supersaturation oxygenation of claim 15, further comprising the step of:
    providing waste water for said liquid.

17. The method of treating a liquid by counter current supersaturation oxygenation of claim 16, further comprising the step of:

treating said waste water with activated sludge before flowing said liquid down said down flow tube.

18. The method of treating a liquid by counter current supersaturation oxygenation of claim 16, further comprising the step of:

treating said waste water with fixed film before flowing said liquid down said down flow tube.

19. The method of treating a liquid by counter current supersaturation oxygenation of claim 15, further comprising the step of:

extending said opposing end of said upflow tube above said gas diffuser.

20. The method of treating a liquid by counter current supersaturation oxygenation of claim 15, further comprising the step of:

providing said down flow tube with a depth of at least 20 feet.

* * * * *